US012598516B2

(12) United States Patent (10) Patent No.: US 12,598,516 B2
Shahab-Masood et al. (45) Date of Patent: Apr. 7, 2026

(54) INTELLIGENT ALLOCATION OF INTERNET PROTOCOL (IP) MULTIMEDIA SUBSYSTEM (IMS) RESOURCES

(71) Applicant: T-Mobile USA, Inc., Bellevue, WA (US)

(72) Inventors: Kishwar Shahab-Masood, Ellicott City, MD (US); Khurram Ahmad Mirza, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 368 days.

(21) Appl. No.: 17/931,602

(22) Filed: Sep. 13, 2022

(65) Prior Publication Data

US 2024/0089799 A1    Mar. 14, 2024

(51) Int. Cl.
*H04W 28/24*      (2009.01)
*H04W 28/08*      (2023.01)

(52) U.S. Cl.
CPC ....... *H04W 28/24* (2013.01); *H04W 28/0925* (2020.05)

(58) Field of Classification Search
CPC ... H04W 28/24; H04W 28/0925; H04W 4/70; H04L 65/1069; H04L 65/756; H04L 47/18; H04L 65/752; H04L 65/80; H04L 65/1016; H04L 67/12
See application file for complete search history.

(56) References Cited

U.S. PATENT DOCUMENTS

| | | | |
|---|---|---|---|
| 2012/0023226 A1* | 1/2012 | Petersen | H04L 67/535 |
| | | | 709/224 |
| 2015/0079988 A1* | 3/2015 | Su | H04W 36/0058 |
| | | | 455/436 |
| 2015/0208352 A1* | 7/2015 | Backholm | H04W 52/0264 |
| | | | 455/574 |
| 2016/0073305 A1* | 3/2016 | Yang | H04W 36/302 |
| | | | 455/436 |
| 2016/0373935 A1* | 12/2016 | Smith | H04M 15/60 |
| 2018/0032698 A1* | 2/2018 | Lau | G16H 50/20 |
| 2018/0176266 A1* | 6/2018 | Filart | H04L 65/80 |
| 2019/0021037 A1* | 1/2019 | Shaw | H04W 36/08 |
| 2019/0098692 A1* | 3/2019 | Atarius | H04L 65/1069 |

(Continued)

OTHER PUBLICATIONS

"International Search Report issued in PCT Application No. PCT/US2023/072523", Mailed Date: Nov. 3, 2023, 11 pages.

*Primary Examiner* — Mewale A Ambaye
(74) *Attorney, Agent, or Firm* — Foley IP Law, PLLC

(57) ABSTRACT

Solutions for intelligent allocation of internet protocol (IP) multimedia system (IMS) resources include: receiving, at a first node, over a wireless network, a request from a client device for a data traffic session passing through an internet protocol (IP) multimedia subsystem (IMS), the client device connected to the wireless network via an air interface; determining, by the first node, a priority of the client device for receiving enhanced services for the data traffic session, the enhanced services requiring a higher bandwidth than non-enhanced services; based on at least the priority of the client device and (in some examples) loading of the wireless network, determining whether the enhanced services are to be allocated for the data traffic session; and based thereon instructing the client device to use non-enhanced services for the data traffic session.

20 Claims, 5 Drawing Sheets

400

(56)                    References Cited

U.S. PATENT DOCUMENTS

2020/0382445 A1*  12/2020  Calmon  .............. H04L 41/5051
2022/0086679 A1*   3/2022  Briggs  ................ H04W 72/543
2023/0413155 A1*  12/2023  Bye  ................... H04W 28/0226

* cited by examiner

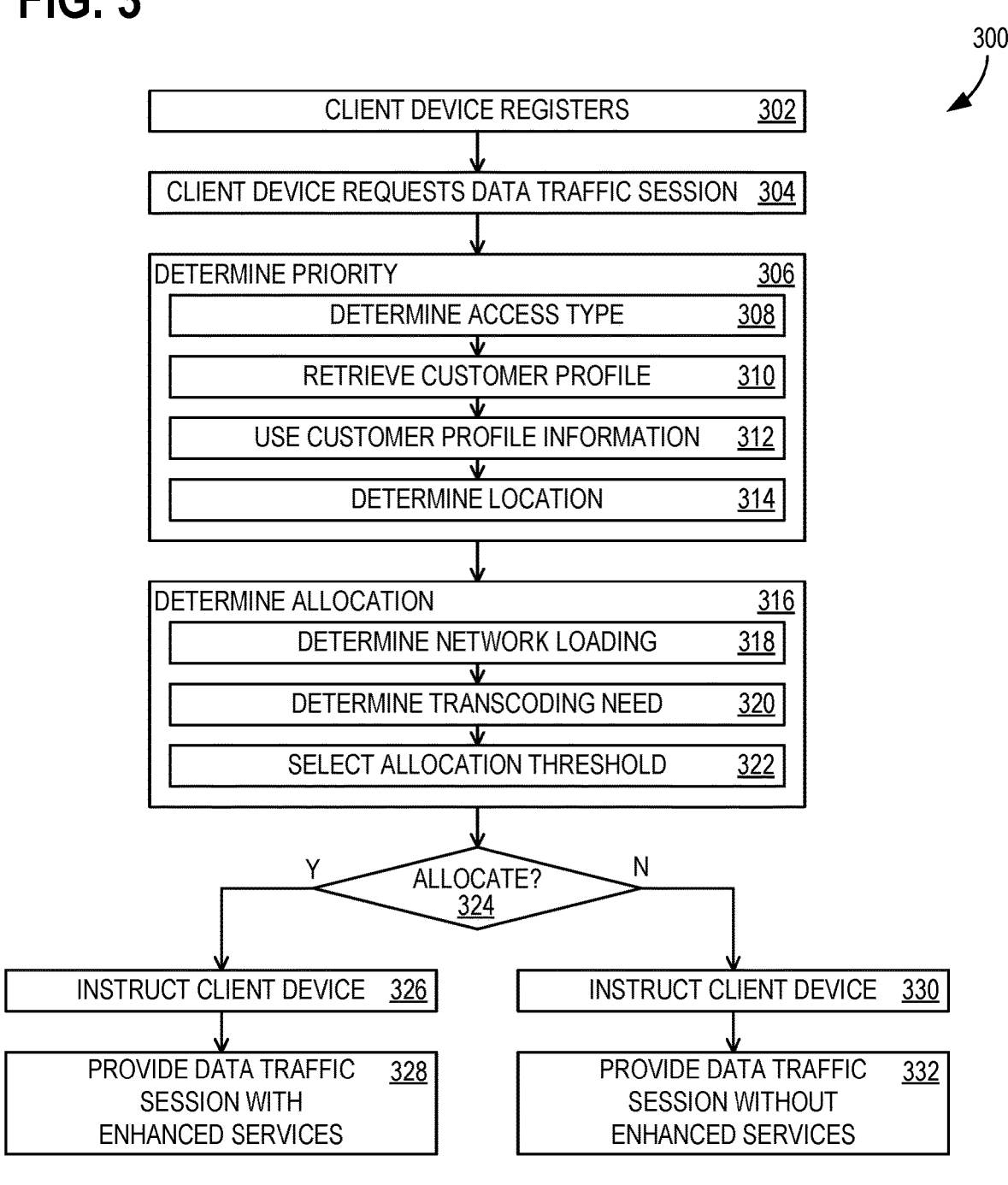

300

CLIENT DEVICE REGISTERS    302

CLIENT DEVICE REQUESTS DATA TRAFFIC SESSION    304

DETERMINE PRIORITY    306
- DETERMINE ACCESS TYPE    308
- RETRIEVE CUSTOMER PROFILE    310
- USE CUSTOMER PROFILE INFORMATION    312
- DETERMINE LOCATION    314

DETERMINE ALLOCATION    316
- DETERMINE NETWORK LOADING    318
- DETERMINE TRANSCODING NEED    320
- SELECT ALLOCATION THRESHOLD    322

Y    ALLOCATE? 324    N

INSTRUCT CLIENT DEVICE    326

PROVIDE DATA TRAFFIC    328
SESSION WITH
ENHANCED SERVICES

INSTRUCT CLIENT DEVICE    330

PROVIDE DATA TRAFFIC    332
SESSION WITHOUT
ENHANCED SERVICES

Figure 4:
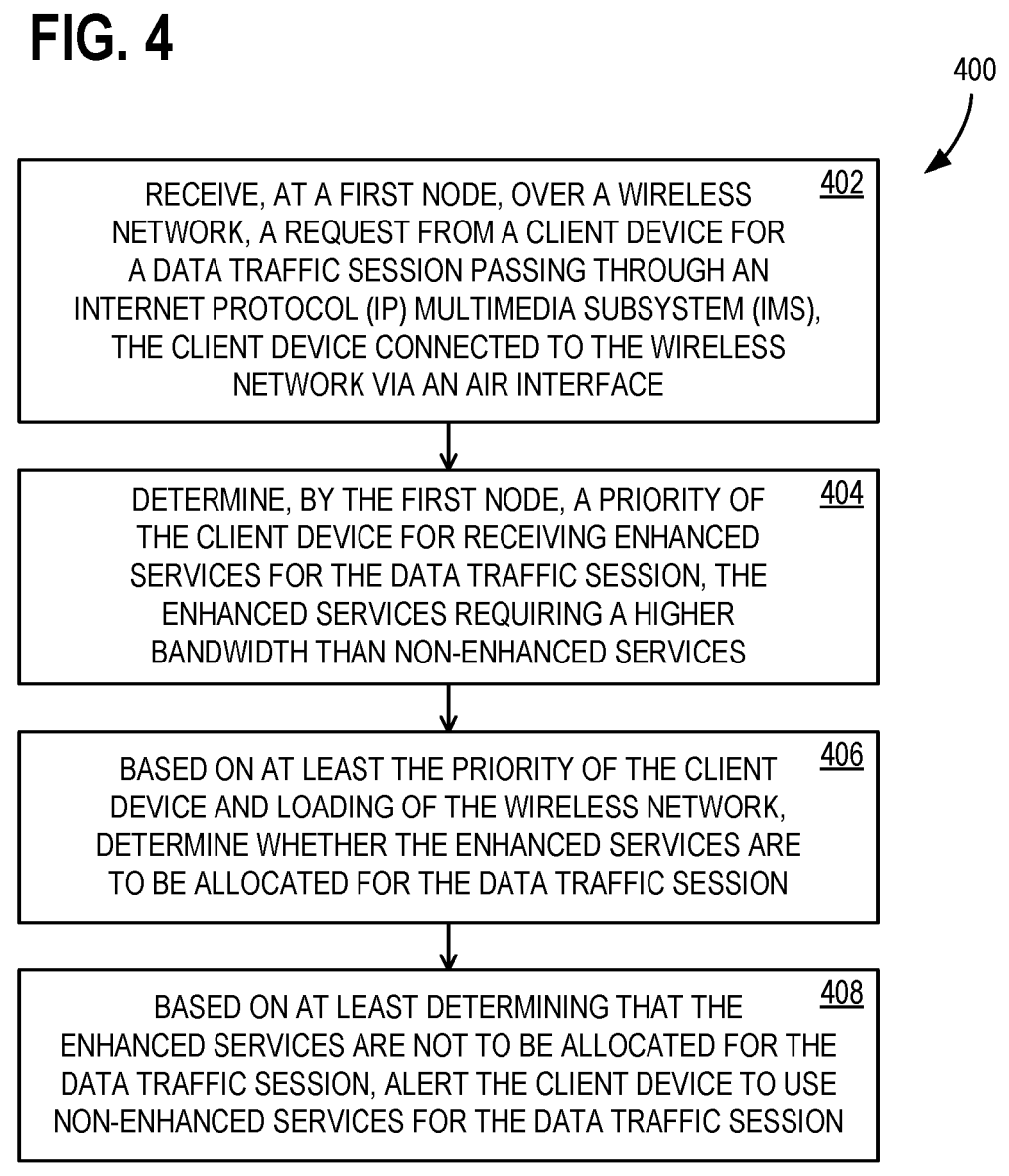

RECEIVE, AT A FIRST NODE, OVER A WIRELESS NETWORK, A REQUEST FROM A CLIENT DEVICE FOR A DATA TRAFFIC SESSION PASSING THROUGH AN INTERNET PROTOCOL (IP) MULTIMEDIA SUBSYSTEM (IMS), THE CLIENT DEVICE CONNECTED TO THE WIRELESS NETWORK VIA AN AIR INTERFACE    402

DETERMINE, BY THE FIRST NODE, A PRIORITY OF THE CLIENT DEVICE FOR RECEIVING ENHANCED SERVICES FOR THE DATA TRAFFIC SESSION, THE ENHANCED SERVICES REQUIRING A HIGHER BANDWIDTH THAN NON-ENHANCED SERVICES    404

BASED ON AT LEAST THE PRIORITY OF THE CLIENT DEVICE AND LOADING OF THE WIRELESS NETWORK, DETERMINE WHETHER THE ENHANCED SERVICES ARE TO BE ALLOCATED FOR THE DATA TRAFFIC SESSION    406

BASED ON AT LEAST DETERMINING THAT THE ENHANCED SERVICES ARE NOT TO BE ALLOCATED FOR THE DATA TRAFFIC SESSION, ALERT THE CLIENT DEVICE TO USE NON-ENHANCED SERVICES FOR THE DATA TRAFFIC SESSION    408

INTELLIGENT ALLOCATION OF INTERNET PROTOCOL (IP) MULTIMEDIA SUBSYSTEM (IMS) RESOURCES

BACKGROUND

Enhanced services, such as enhanced voice services (EVS) and others, such as enhanced video and enhanced machine-to-machine (M2M) services, place higher demands on cellular networks, such as higher bandwidth demand and, in some scenarios, more computationally-intensive transcoding. Some enhanced services, also referred to as enriched services, pass through an internet protocol (IP) multimedia subsystem (IMS), burdening the IMS. Client devices, such as user equipment (UEs) and internet of things (IoT) devices, that support enhanced services, may automatically request enhanced services.

Currently, IMS codec resources are made available based on the access network type, such as fifth generation technology (5G) cellular, fourth-generation technology (4G) cellular, WiFi, or older circuit-switched (CS) network technology. However, in scenarios for which additional factors may be relevant, allocating enhanced services based merely on client device requests and access network type is an inefficient use of IMS resources.

SUMMARY

The following summary is provided to illustrate examples disclosed herein, but is not meant to limit all examples to any particular configuration or sequence of operations.

Solutions for intelligent allocation of internet protocol (IP) multimedia system (IMS) resources include: receiving, at a first node, over a wireless network, a request from a client device for a data traffic session passing through an internet protocol (IP) multimedia subsystem (IMS), the client device connected to the wireless network via an air interface; determining, by the first node, a priority of the client device for receiving enhanced services for the data traffic session, the enhanced services requiring a higher bandwidth than non-enhanced services; based on at least the priority of the client device and (in some examples) loading of the wireless network, determining whether the enhanced services are to be allocated for the data traffic session; and based on at least determining that the enhanced services are not to be allocated for the data traffic session, instructing the client device to use non-enhanced services for the data traffic session.

BRIEF DESCRIPTION OF THE DRAWINGS

The disclosed examples are described below with reference to the accompanying drawing figures listed below, wherein:

FIG. 2 illustrates further detail for components of the architecture of FIG. 1;

FIG. 3 illustrates a flowchart of exemplary operations associated with examples of the architecture of FIG. 1;

FIG. 4 illustrates another flowchart of exemplary operations associated with examples of the architecture of FIG. 1.

Figure 1:
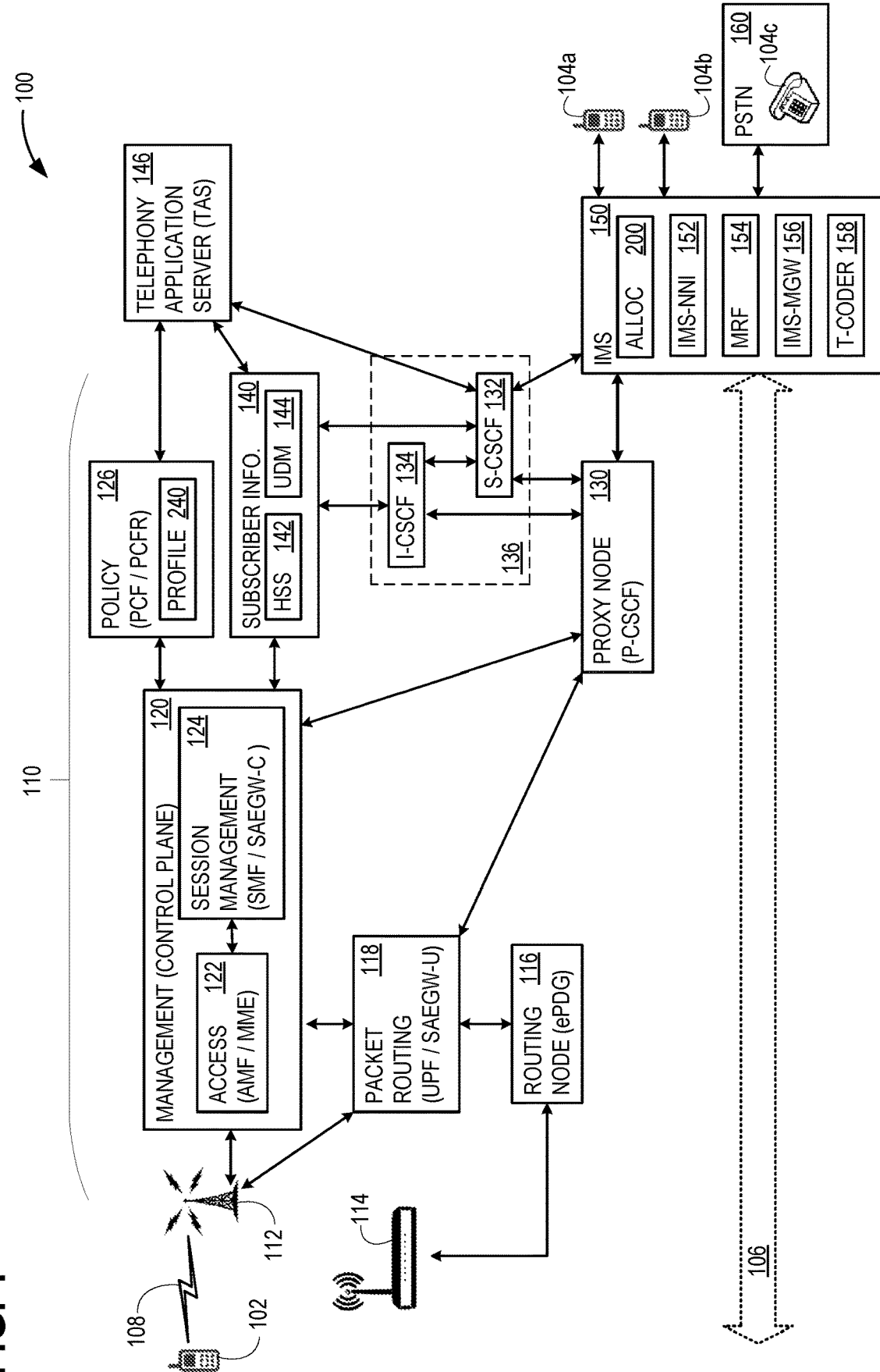
FIG. 1 illustrates an exemplary architecture that advantageously provides intelligent allocation of internet protocol (IP) multimedia subsystem (IMS) resources.

Corresponding reference characters indicate corresponding parts throughout the drawings, where practical. References made throughout this disclosure relating to specific examples, are provided for illustrative purposes, and are not meant to limit all implementations or to be interpreted as excluding the existence of additional implementations that also incorporate the recited features.

DETAILED DESCRIPTION

Solutions for intelligent allocation of internet protocol (IP) multimedia system (IMS) resources include: receiving, at a first node, over a wireless network (e.g., a cellular network), a request from a client device for a data traffic session passing through an internet protocol (IP) multimedia subsystem (IMS), the client device connected to the wireless network via an air interface; determining, by the first node, a priority of the client device for receiving enhanced services for the data traffic session, the enhanced services requiring a higher bandwidth than non-enhanced services; based on at least the priority of the client device, determining whether the enhanced services are to be allocated for the data traffic session; and based on at least determining that the enhanced services are not to be allocated for the data traffic session, instructing the client device to use non-enhanced services for the data traffic session.

Aspects of the disclosure improve the efficiency of cellular communications by intelligently allocating IMS resources according to a prioritization scheme, for example by determining a priority of a client device for receiving enhanced services and, based on at least the priority of the client device and loading of the wireless network, determining whether the enhanced services are to be allocated. The prioritization scheme may have multiple tiers and stages of determination to intelligently allocate the use of enhanced services resources, such as enhanced voice services (EVS) transcoder resources, to improve efficiency of available call processing capacity in the IMS.

Enhanced Voice Services (EVS) is a super-wideband speech audio coding standard that offers up to 20 kHz audio bandwidth and has high robustness to delay jitter and packet losses due to channel aware coding and improved packet loss concealment. EVS is described in at least Third Generation Partnership Project (3GPP) technical standard (TS) 26.441. The application areas of EVS include improved telephony and teleconferencing, audiovisual conferencing services, and streaming audio. In some scenarios EVS, is referred to as HD+voice.

In some examples, the EVS bit rate and audio bandwidth supporting upper or lower range selection setting will be automatically configured (controlled) by the serving proxy-call session control function (P-CSCF) and/or media resource function processor (MRFP). By enabling the controlling of EVS transcoding bit rate and bandwidth ranges by the P-CSCF and/or MRFP radio cell capacity may be saved, providing wider coverage and minimizing IP packet loss for voice services, while managing the impact to voice quality. For example, if a first client device is a user equipment (UE) that supports EVS is engaging in a voice call with another US that does not support EVS, the voice quality will not be degraded for the UE that supports EVS by instructing that UE to use a lower bit rate voice codec, because the voice call would need to be transcoded to the lower bit rate voice codec, anyway. Thus, the radio cell capacity saving is transparent to the user having the UE that supports EVS.

With reference now to the figures, FIG. 1 illustrates an architecture 100 that advantageously provides intelligent network resource allocation for IMS resources. In architecture 100, a wireless network 110 provides a data traffic session 106 for client device 102 communicating with another client device 104a, client device 104b, and/or client device 104c through an IMS 150. IMS 150 provides an architectural framework for delivering IP-based multimedia services.

Client devices 102, 104a, and 104b may be cellular UEs or internet of thing (IoT) devices. Client device 104c is connected to a public switched telephone network (PSTN) 160, and is shown as a traditional telephone (e.g., a PSTN device). PSTN 160 uses circuit-switched (CS) network technology. An IoT device may be a connected appliance, a smart home security system, an autonomous factory or farming machine, a wearable health monitor, a wireless inventory tracker, or another device.

Wireless network 110 may be a fifth-generation technology (5G) cellular, fourth-generation technology (4G) cellular, or other network (e.g., a future 6G network). Client device 102 accesses wireless network 110 using an air interface 108 to a base station 112 of wireless network 110 or a WiFi router 114. For 5G, base station 112 may comprise a gNodeB (gNB), so that air interface 108 is a 5G cellular interface, and a voice call may be voice over new radio (VoNR). For 4G, base station 112 may comprise an eNodeB (eNB), so that air interface 108 is a 4G cellular interface, and a voice call may be voice over long term evolution (VoLTE). For air interface 108, cellular networks may use orthogonal frequency-division multiple access (OFDMA), which uses a combination of orthogonal frequency-division multiplexing (OFDM) and time domain multiple access (TDMA).

For WiFi, air interface 108 is a WiFi interface, and a voice call may be voice over WiFi (VoWiFi). In some examples, data traffic session 106 comprises a voice call or a video call, or machine-to-machine (M2M) communication. In some examples, a voice or video call may be a two-party call between client device 102 and a single one of client devices 104a, 104b, and 104c. In some examples, a voice or video call may be a multi-party call between client device 102 and two or more of client devices 104a, 104b, and 104c. In some examples, data traffic session 106 comprises streaming video.

In some scenarios, data traffic session 106 requires transcoding. This may occur when client device 102 uses a different codec than the distant end device with which it is communicating. For example, if client device 102 is using EVS and is engaged in a voice call with client device 104a that is using an older codec, transcoding will be required. As another example, if client device 102 is engaged in a voice call with client device 104c, which is a PSTN device, transcoding will be required for any cellular codec used by client device 102 (in addition to signaling conversion). Transcoding is performed within IMS 150, in some examples, as described below.

4G and 5G cellular network employs control plane and user plane separation (CUPS), which separates wireless network 110 into a control plane and a user plane. Multiple benefits arise from CUPS. One benefit is that session management node 124 may be located in a centralized location for ease of management, while packet routing node 118 is located elsewhere, based on latency and other performance issues for user plane data traffic between a client device and either an external data network (DN) or IMS 150. Another benefit is that wireless network 110 may have the control plane capacity and user plane capacity scaled separately, based on actual and expected dominant traffic type.

The control plane includes at least an access node 122 and a session management node 124 in a session management portion 120. The user plane includes at least a packet routing node 118 and proxy node 130. Data packets for signaling that sets up data traffic session 106, and data session control, pass from base station 112 through access node 122 to session management node 124. In some examples, data traffic session 106 is set up using session initiation protocol (SIP) signaling. Data packets of data traffic session 106 pass from base station 112 through a packet routing node 118 and a proxy node 130 to IMS 150 (although proxy node 130 may be considered to be within IMS 150).

For 5G, access node 122 may comprise an access and mobility management function (AMF), session management node 124 may comprise a session management function (SMF), and packet routing node 118 may comprise a user plane function (UPF). For a 4G, access node 122 may comprise a mobility management entity (MME), session management node 124 may comprise a system architecture (SAE) evolution gateway—control plane (SAEGW-C), and packet routing node 118 may comprise an SAE evolution gateway—user plane (SAEGW-U). An SAEGW-C is the combination of a serving gateway (SGW)— control plane (SGW-C) and a packet data network gateway (PGW)— control plane (PGW-C). An SAEGW-U is the combination of an SGW— user plane (SGW-U) and a PGW— user plane (PGW-U). In some examples, proxy node 130 comprises a proxy-call session control function (P-CSCF).

Access node 122 supports the termination of non-access stratum (NAS) signaling, is which is a functional layer in wireless telecom protocol stacks between core network equipment of wireless network 110 and client devices. NAS signaling is used to manage the establishment of communication sessions and for maintaining continuous communications with the user equipment as they move. Base station 112 selects access node 122 (from a plurality of access nodes in wireless network 110) for a particular client device, based on network slicing constraints and support requested by the client device. Network slicing partitions wireless network 110 into multiple virtual networks. One function of access node 122 is to route control plane data packets between base station 112 and session management node 124.

Session management node 124 is responsible for interacting with the decoupled data plane, creating updating and removing protocol data unit (PDU) sessions and managing session context with packet routing node 118. Packet routing node 118 performs packet routing and forwarding, packet inspection, and quality of service (QoS) handling for user plane data packets. Packet routing node 118 handles external protocol data unit (PDU) sessions between wireless network 110 and external DNs, for example, the internet. One function of packet routing node 118 is to route user plane data packets between base station 112 and proxy node 130, under management by session management node 124.

WiFi traffic (e.g., VoWiFi data packets) enter wireless network 110 through a routing node 116 that routes traffic between WiFi router 114 and packet routing node 118. In some examples, routing node 116 comprises an evolved packet data gateway (ePDG).

Proxy node 130 is the contact point between wireless network 110 and IMS 150 and functions as a proxy server for the client devices whose user plane data packets pass through base station 112 and packet routing node 118. SIP signaling traffic to and from a client device passes through proxy node 130. Client devices discover proxy node 130 via a discovery process using a network function (NF) repository function (NRF) in wireless network 110.

A subscriber information node 140 includes a home subscriber server (HSS) 142 and, for 5G, a unified data management function (UDM) 144. HSS 142 provides a user database and wireless network 110 works with both legacy and concurrent services. UDM 144 provides centralized control of network user data, similarly to HSS 142, but for 5G. A stateful form stores data locally to UDM 144. Subscriber information node 140 is in communication with session management node 124. Subscriber information node 140 is also in communication with proxy node 130 via a call session control function (CSCF) 136. CSCF 136 comprises a serving-CSCF (S-CSCF) 132 and an interrogating-CSCF (I-CSCF) 134.

In some examples, also includes functionality for an access transfer control function (ATCF) and/or an access transfer gateway (ATGW). An ATCF reduces voice interruption delays and acts as an anchor point for SIP signaling, sitting between a P-CSCF and an I-CSCF/S-CSCF in the signaling flow. An ATGW is a media function that is used to anchor a media stream, under the controlled of the ATCF. In some examples, ATGW functionality is instead within an IMS— media gateway (IMS-MGW) 156, described below.

S-CSCF 132 is the node primarily responsible for session control. Subscribers are allocated an S-CSCF for the duration of their IMS registration in order to facilitate routing of SIP messages as part of service establishment procedures. I-CSCF 134 enables requests to be routed to the correct S-CSCF, because wireless network 110 may have multiple S-CSCFs.

CSCF 136 is in communication with a telephony application server (TAS) 146. TAS 146 is a back-to-back SIP user agent that maintains the call state. TAS 146 contains the service logic that provides the basic call processing services including digit analysis, routing, call setup, call waiting, call forwarding, conferencing, and others.

A policy node 126 provides policy control decisions and flow-based charging controls and hosts a customer profile 240 that is associated with client device 102. Policy node 126 determines how a service data flow is to be treated in the enforcement function, and ensure that the user plane traffic mapping and treatment is in accordance with the user's profile. In some examples, policy node 126 acts as a mediator of network resources for IMS 150 for establishing calls and allocating requested bandwidth to the call bearer with configured attributes. This enables offering differentiated voice services to users of wireless network 110 by charging a premium for some call types, as well as prioritizing calls to emergency numbers. Policy node 126 comprises a policy and charging rules function (PCRF) for 4G and a policy control function (PCF) for 5G. Policy node 126 communicates with session management node 124 and TAS 146. Customer profile 240 is shown in further detail in FIG. 2.

IMS 150 includes an inter-IMS network to network interface (IMS-NNI) 152, a multimedia resource function (MRF) 154, IMS-MGW 156, and a transcoder 158. IMS-NNI 152 supports interoperable communication between different IMS networks and assists IMS networks to comply with the interoperability requirements defined within national and international regulatory frameworks. MRF 154, in conjunction with S-CSCF 132 and an application server (e.g., TAS 146), is responsible for carrying out a variety of processing tasks on media streams associated with particular services. MRF 154 provides media related functions such as media manipulation (e.g., voice stream mixing) and playing of tones and announcements.

In some examples, MRF 154 is divided into a media resource function controller (MRFC) and a media resource function processor (MRFP). The MRFC is a signaling plane node that interprets information coming from TAS 146 and S-CSCF 132 to control the MRFP. The MRFP is a media plane node used to mix, source, or process media streams and manage access right to shared resources.

IMS-MGW 156 handles the media plane (voice) bearer as part of an IP-based call and provides termination for CS and packet-switched (PS) media stream termination. Transcoder 158 provides transcoding and conversion services, such as converting from a codec used by one client device into the codec used by another codec device and/or a call on PSTN 160 and may be implemented within IMS-MGW 156 or as a media gateway control function (MGCF). When a MGCF works as a breakout to PSTN 160, it is also responsible for managing the conversion of signaling messages, such as converting SIP messaging to/from bearer independent call control (BICC) signaling, and other signaling used by PSTN 160.

Figure 2:
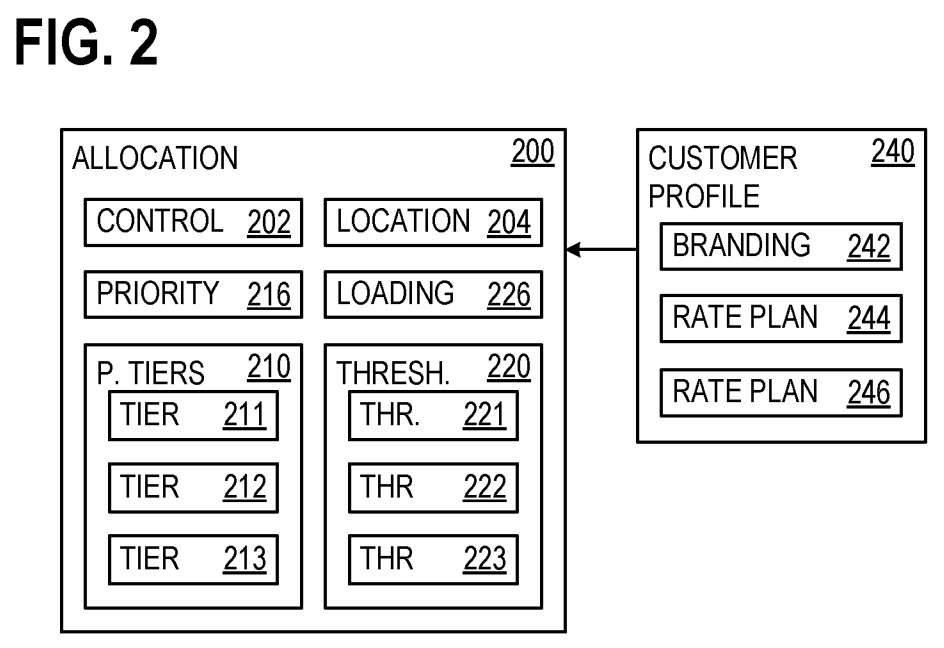

Allocation node 200, which is shown in further detail and described in relation to FIG. 2, may be located within IMS 150, S-CSCF 132, or elsewhere within wireless network 110. It should be understood that examples of wireless network 110 may use different numbers of elements than shown. For example, a common core network may have six to ten pools of approximately a dozen or more P-CSCFs each. Any of CSCF 136, proxy node 130, subscriber information node 140, and TAS 146 may be located within wireless network 110 or within IMS 150.

FIG. 2 illustrates further detail for allocation node 200 and customer profile 240. Allocation node 200 has control logic 202 that determines a priority 216 of client device 102 for receiving enhanced services for data traffic session 106; and based on at least priority 216 and, in some examples also a loading 226 of wireless network 110, determines whether enhanced services are to be allocated for data traffic session 106. Allocation node 200 then instructs other elements of wireless network 110 accordingly. Base station 112 will then either instruct client device 102 to use non-enhanced services for data traffic session 106 or instruct client device 102 that enhanced services may be used for data traffic session 106.

Allocation node 200 may use a wide variety of prioritization criteria to determine priority 216. For example, the network access type, 5G, 4G, or WiFi, may be used, with highest priority going to the newest cellular generation supported by wireless network 110, and decreasing to the oldest cellular generation supported by wireless network 110 (e.g., 5G is a higher priority than 4G). In some examples, WiFi may be given the lowest priority. This access type information is available from wireless network 110, such as from a P-CSCF parameter session description protocol (SDP). SDP is a format for describing multimedia communication sessions for the purposes of announcement and invitation.

Within a network access type, another layer of prioritization may be determined, based on customer profile 240 that is associated with client device 102 and fetched from policy node 126. Customer profile 240 may include branding information 242, rate plan information 244, and other information 246. Branding information 242 includes information regarding whether client device 102 is covered by a subscription plan of a flagship service or a reseller, such as a mobile virtual network operator (MVNO). Rate plan information 244 includes information regarding whether client device 102 is covered by a subscription (post-paid) or uses a pre-paid account. For example, priority may be highest for 5G users operating under a subscription plan of a flagship service. The next lower tiers in descending order (in some examples) are 5G users operating under a subscription plan of a reseller, 5G users operating under a pre-paid plan, 4G users operating under a subscription plan of a flagship service flagship service, 4G users operating under a subscription plan of a reseller, and then 4G users operating under a pre-paid plan.

Roaming client devices may be placed at a lower priority than client devices in a home network. Roaming prioritization takes into account network-to-network inter-carrier peering agreements for mobile originated/terminated traffic exchange, and other international and domestic roaming agreements with other wireless network operators.

In some examples, client devices using WiFi may be placed at an even lower priority than roamers. Other prioritization schemes may also be used. In some examples, enhanced services may be blocked entirely for client devices located in certain countries and using WiFi. To support this, a client device location 204 (e.g., a geographical location) is collected that includes a country code corresponding to a country in which client device 102 is located.

In the illustrated example, priority 216 is set to one of a pre-determined set of priority tiers 210. For example, the highest priority may be set to priority tier 211, the second highest priority may be set to priority tier 212, the third the highest priority may be set to priority tier 213, and so on.

In some examples, the loading of wireless network 110 is used in determining whether enhanced services are to be allocated for data traffic session 106. Network loading information, reflected in loading 226, may be current loading of wireless network 110 or, in some examples in which network loading predictions are made, also include expected future loading. A set of allocation thresholds 220 is illustrated that includes a highest allocation threshold 221, a second highest allocation threshold 222, a third allocation highest threshold 223, and so on.

In an example operation, control logic 202 determines priority 216 of client device 102 as one of priority tiers 211-213. Control logic 202 also determines loading 226, and based on at least loading 226, selects one of allocation thresholds 221-223. If data traffic session 106 requires transcoding, control logic 202 may select a higher allocation threshold than if transcoding is not required. If priority 216 is below the selected allocation threshold (i.e., fails to meet the selected allocation threshold), client device is instructed to use non-enhanced services. If, however, priority 216 meets (i.e., matches or exceeds) the selected allocation threshold, client device is instructed to use enhanced services.

FIG. 3 illustrates a flowchart 300 of exemplary operations associated with architecture 100 providing data traffic session 106 for client device 102. In some examples, at least a portion of flowchart 300 may be performed using one or more computing devices 500 of FIG. 5 (e.g., base station 112, access node 122, session management node 124, packet routing node 118, and proxy node 130 may use examples of computing device 500).

Flowchart 300 commences with client device 102 registering with wireless network 110 in operation 302, so that base station 112 is a serving base station of client device 102. Operation 304 includes receiving, at allocation node 200, over wireless network 110, a request from client device 102 for data traffic session 106 passing through IMS 150. Client device 102 is connected to wireless network 110 via air interface 108.

Allocation node 200 determines priority 216 of client device 102 for receiving enhanced services for data traffic session 106, in operation 306. Operation 306 is performed using operations 308-314. Operation 308 determines whether air interface 108 comprises a 5G cellular interface, a 3G cellular interface, or a WiFi interface. In operation 310, allocation node 200 retrieves information associated with customer profile 240 from policy node 126 (e.g., a PCRF or PCF). Operation 312 determines a service priority based on customer profile 240 associated with client device 102, and operation 314 determines a geographical location (e.g., location 204) of client device 102.

Allocation node 200 determines whether the enhanced services are to be allocated for data traffic session 106, based on at least priority 216 of client device 102 and (in some examples) loading 226 of wireless network 110, in operation 316. Operation 316 is performed using operations 318-322 and acted upon by decision operation 324. Operation 318 determines loading 226 of wireless network 110, operation 320 determines whether data traffic session 106 requires transcoding, and operation 322 selects an allocation threshold.

Decision operation 324 determines to allocate the enhanced services if the loading of wireless network 110 meets the selected allocation threshold or determines to not allocate the enhanced services if the loading of wireless network 110 is below the selected allocation threshold. If enhanced services are to be provided, operation 326 instructs client device 102 accordingly. Wireless network 110 provides the enhanced services for data traffic session 106 in operation 328, based on at least determining that the enhanced services are to be allocated for data traffic session 106.

Otherwise, based on at least determining that the enhanced services are not to be allocated for data traffic session 106, operation 330 instructs client device 102 to use non-enhanced services for data traffic session 106. Wireless network 110 provides data traffic session 106 without enhanced services, in operation 332.

FIG. 4 illustrates a flowchart 400 of exemplary operations associated with examples of architecture 100. In some examples, at least a portion of flowchart 400 may be performed using one or more computing devices 500 of FIG. 5. Flowchart 5400 commences with operation 402, which includes receiving, at a first node, over a wireless network, a request from a client device for a data traffic session passing through an IMS, the client device connected to the wireless network via an air interface.

Operation 404 includes determining, by the first node, a priority of the client device for receiving enhanced services for the data traffic session, the enhanced services requiring a higher bandwidth than non-enhanced services. Operation 406 includes, based on at least the priority of the client device and loading of the wireless network, determining whether the enhanced services are to be allocated for the data traffic session. Operation 408 includes, based on at least determining that the enhanced services are not to be allocated for the data traffic session, instructing the client device to use non-enhanced services for the data traffic session.

Figure 5:
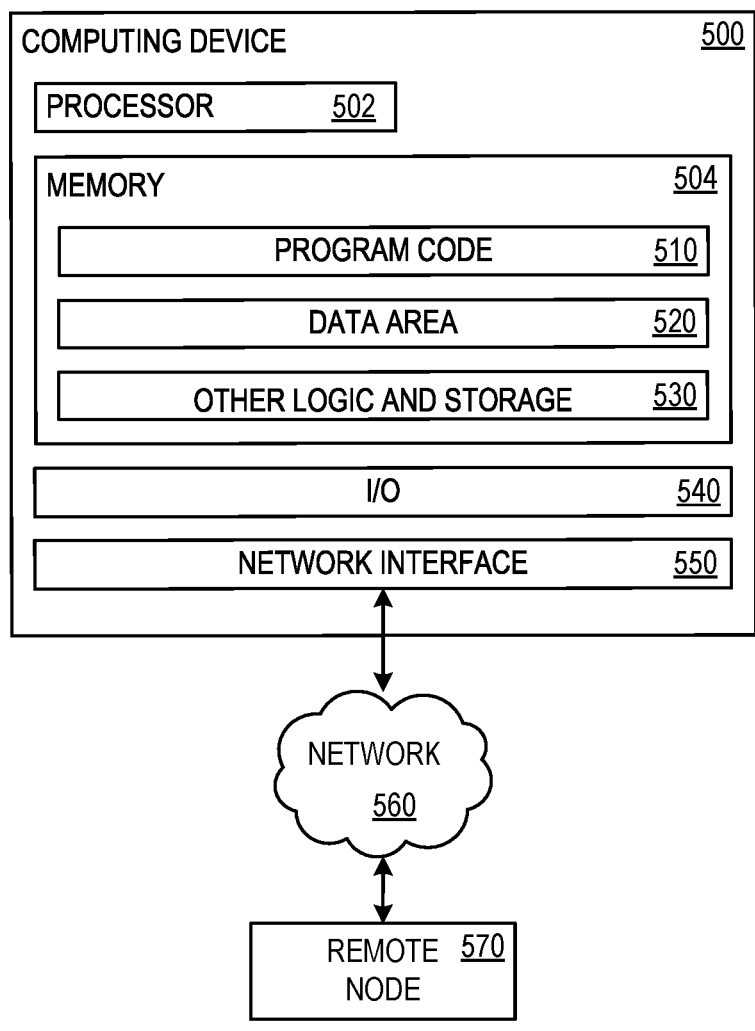
FIG. 5 illustrates a block diagram of a computing device suitable for implementing various aspects of the disclosure.

FIG. 5 illustrates a block diagram of computing device 500 that may be used as any component described herein that may require computational or storage capacity. Computing device 500 has at least a processor 502 and a memory 504 that holds program code 510, data area 520, and other logic and storage 530. Memory 504 is any device allowing information, such as computer executable instructions and/ or other data, to be stored and retrieved. For example, memory 504 may include one or more random access memory (RAM) modules, flash memory modules, hard disks, solid-state disks, persistent memory devices, and/or optical disks. Program code 510 comprises computer executable instructions and computer executable components including any instructions necessary to perform operations described herein. Data area 520 holds any data necessary to perform operations described herein. Memory 504 also includes other logic and storage 530 that performs or facilitates other functions disclosed herein or otherwise required of computing device 500. An input/output (I/O) component 540 facilitates receiving input from users and other devices and generating displays for users and outputs for other devices. A network interface 550 permits communication over a network 560 with a remote node 570, which may represent another implementation of computing device 500. For example, a remote node 570 may represent another of the above-noted nodes within architecture 100.

Additional Examples

An example method of providing a data traffic session over a wireless network comprises: receiving, at a first node, over a wireless network, a request from a client device for a data traffic session passing through an IMS, the client device connected to the wireless network via an air interface; determining, by the first node, a priority of the client device for receiving enhanced services for the data traffic session, the enhanced services requiring a higher bandwidth than non-enhanced services; based on at least the priority of the client device and loading of the wireless network, determining whether the enhanced services are to be allocated for the data traffic session; and based on at least determining that the enhanced services are not to be allocated for the data traffic session, instructing the client device to use non-enhanced services for the data traffic session.

An example system for providing a data traffic session over a wireless network comprises: a processor; and a computer-readable medium storing instructions that are operative upon execution by the processor to: receive, at a first node, over a wireless network, a request from a client device for a data traffic session passing through an IMS, the client device connected to the wireless network via an air interface; determine, by the first node, a priority of the client device for receiving enhanced services for the data traffic session, the enhanced services requiring a higher bandwidth than non-enhanced services; based on at least the priority of the client device and loading of the wireless network, determine whether the enhanced services are to be allocated for the data traffic session; and based on at least determining that the enhanced services are not to be allocated for the data traffic session, instruct the client device to use non-enhanced services for the data traffic session.

One or more example computer storage devices has computer-executable instructions stored thereon, which, upon execution by a computer, cause the computer to perform operations comprising: receiving, at a first node, over a wireless network, a request from a client device for a data traffic session passing through an IMS, the client device connected to the wireless network via an air interface; determining, by the first node, a priority of the client device for receiving enhanced services for the data traffic session, the enhanced services requiring a higher bandwidth than non-enhanced services; based on at least the priority of the client device and loading of the wireless network, determining whether the enhanced services are to be allocated for the data traffic session; and based on at least determining that the enhanced services are not to be allocated for the data traffic session, instructing the client device to use non-enhanced services for the data traffic session.

Alternatively, or in addition to the other examples described herein, examples include any combination of the following:

the enhanced services comprise a service type selected from the list consisting of EVS, enhanced video services and enhanced M2M communication services;

based on at least determining that the enhanced services are to be allocated for the data traffic session, providing the enhanced services for the data traffic session;

determining the priority of the client device comprises determining whether the air interface comprises a 5G cellular interface or a 4G cellular interface or a WiFi interface;

determining the priority of the client device comprises determining a service priority based on a customer profile associated with the client device;

determining whether the enhanced services are to be allocated comprises, selecting an allocation threshold;

determining whether the enhanced services are to be allocated further comprises determining to not allocate the enhanced services, if the loading of the wireless network is below the selected allocation threshold, or determining to allocate the enhanced services, if the loading of the wireless network meets the selected allocation threshold;

determining the priority of the client device comprises determining a geographical location of the client device;

determining whether the enhanced services are to be allocated comprises determining whether the data traffic session requires transcoding;

the first node is located within the IMS; the first node is located within an S-CSCF; the wireless network comprises a 5G cellular network;

the wireless network comprises a 4G cellular network;

the client device comprises a UE; the client device comprises an IoT device;

the request for the data traffic session comprises a SIP request;

the data traffic session comprises a voice call;

the data traffic session comprises a video call;

the data traffic session comprises a two-party call;

the data traffic session comprises a multi-party call involving three or more client devices;

the data traffic session comprises a call between two cellular devices;

the data traffic session comprises a call between a cellular device and a PSTN device;

the data traffic session comprises streaming video;

the data traffic session comprises M2M communication;

the data traffic session requires transcoding;

the first node retrieves information associated with the customer profile from a PCRF or PCF;

the loading of the wireless network comprises current loading and expected future loading; and the first node determines whether the enhanced services are to be allocated for the data traffic session.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure. It will be understood that the benefits and advantages described above may relate to one embodiment or may relate to several embodiments. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of."

Having described aspects of the disclosure in detail, it will be apparent that modifications and variations are possible without departing from the scope of aspects of the disclosure as defined in the appended claims. As various changes may be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method comprising:

receiving, at a first node, a request for establishing a data traffic session of a first client device over an internet protocol (IP) multimedia subsystem (IMS) of a wireless network, the first client device connected to the wireless network via an air interface;

determining, by the first node, a priority of the first client device for receiving enhanced services over the wireless network, the enhanced services requiring a higher bandwidth than non-enhanced services;

selecting, based on a loading of the wireless network, a threshold for allocating IMS enhanced service resources of the wireless network;

comparing the priority of the first client device for receiving the enhanced services over the wireless network with the threshold for allocating the IMS enhanced service resources of the wireless network; and instructing the first client device to use the non-enhanced services for the data traffic session based at least on the priority of the first client device for receiving the enhanced services over the wireless network being less than the threshold for allocating the IMS enhanced service resources of the wireless network.

2. The method of claim 1, wherein the enhanced services comprise a service type selected from the list consisting of: enhanced voice services (EVS), enhanced video services and enhanced machine-to-machine (M2M) communication services.

3. The method of claim 1, wherein the priority of the first client device for receiving the enhanced services over the wireless network is determined based on whether the air interface comprises a fifth-generation technology (5G) cellular interface, a fourth-generation technology (4G) cellular interface, or a WiFi interface.

4. The method of claim 1, wherein the priority of the first client device for receiving the enhanced services over the wireless network is determined based on a customer profile associated with the first client device.

5. The method of claim 1, wherein the priority of the first client device for receiving the enhanced services over the wireless network is determined based on a geographical location of the first client device.

6. A system comprising:

a processor; and a computer-readable medium storing instructions that are operative upon execution by the processor to:

receive, at a first node, a request for establishing a data traffic session of a first client device over an internet protocol (IP) multimedia subsystem (IMS) of a wireless network, the first client device connected to the wireless network via an air interface;

determine, by the first node, a priority of the first client device for receiving enhanced services over the wireless network, the enhanced services requiring a higher bandwidth than non-enhanced services;

select based on a loading of the wireless network, a threshold for allocating IMS enhanced service resources of the wireless network;

compare the priority of the first client device for receiving the enhanced services over the wireless network with the threshold for allocating the IMS enhanced service resources of the wireless network; and instruct the first client device to use the non-enhanced services for the data traffic session based at least on the priority of the first client device for receiving the enhanced services over the wireless network being less than the threshold for allocating the IMS enhanced service resources of the wireless network.

7. The system of claim 6, wherein the enhanced services comprise a service type selected from the list consisting of: enhanced voice services (EVS), enhanced video services and enhanced machine-to-machine (M2M) communication services.

8. The system of claim 6, wherein the priority of the first client device for receiving the enhanced services over the wireless network is determined based on whether the air interface comprises a fifth-generation technology (5G) cellular interface, a fourth-generation technology (4G) cellular interface, or a WiFi interface.

9. The system of claim 6, wherein the priority of the first client device for receiving the enhanced services over the wireless network is determined based on a customer profile associated with the first client device.

10. The system of claim 6, wherein the threshold for allocating the IMS enhanced service resources of the wireless network is further selected based on whether the data traffic session requires transcoding.

11. One or more computer storage devices having computer-executable instructions stored thereon, which, upon execution by a computer, cause the computer to perform operations comprising:

receiving, at a first node, a request for establishing a data traffic session of a first client device over an internet protocol (IP) multimedia subsystem (IMS) of a wireless network, the first client device connected to the wireless network via an air interface;

determining, by the first node, a priority of the first client device for receiving enhanced services over the wireless network, the enhanced services requiring a higher bandwidth than non-enhanced services;

selecting, based on a loading of the wireless network, a threshold for allocating IMS enhanced service resources of the wireless network;

comparing the priority of the first client device for receiving the enhanced services over the wireless network with the threshold for allocating the IMS enhanced service resources of the wireless network; and instructing the first client device to use the non-enhanced services for the data traffic session based at least on the priority of the first client device for receiving the enhanced services over the wireless network being less than the threshold for allocating the IMS enhanced service resources of the wireless network.

12. The one or more computer storage devices of claim 11, wherein the enhanced services comprise a service type selected from the list consisting of:

enhanced voice services (EVS), enhanced video services and enhanced machine-to-machine (M2M) communication services.

13. The one or more computer storage devices of claim 11, wherein the priority of the first client device for receiving the enhanced services over the wireless network is determined based on whether the air interface comprises a fifth-generation technology (5G) cellular interface, a fourth-generation technology (4G) cellular interface, or a WiFi interface.

14. The one or more computer storage devices of claim 11, wherein the priority of the first client device for receiving the enhanced services over the wireless network is determined based on a customer profile associated with the first client device.

15. The one or more computer storage devices of claim 11, wherein the priority of the first client device for receiving the enhanced services over the wireless network is determined based on a geographical location of the first client device.

16. The one or more computer storage devices of claim 11, wherein the threshold for allocating the IMS enhanced service resources of the wireless network is further selected based on whether the data traffic session requires transcoding.

17. The one or more computer storage devices of claim 11, wherein the operations further comprise:

receiving a request from a second client device for a separate data traffic session passing through the IMS, the first client device and the second client device being connected to the wireless network via a common access point;

determining a priority of the second client device for receiving the enhanced services over the wireless network based at least on a customer profile of the second client device; and instructing the second client device to use the non-enhanced services for the separate data traffic session based at least on the priority of the second client device for receiving the enhanced services over the wireless network being greater than or equal to the threshold for allocating the IMS enhanced service resources of the wireless network.

18. The system of claim 6, wherein the priority of the first client device for receiving the enhanced services over the wireless network is determined based on a geographical location of the first client device.

19. The method of claim 1, wherein the threshold for allocating the IMS enhanced service resources of the wireless network is further selected based on whether the data traffic session requires transcoding.

20. The method of claim 1, further comprising:

receiving a request from a second client device for a separate data traffic session passing through the IMS, the first client device and the second client device being connected to the wireless network via a common access point;

determining a priority of the second client device for receiving the enhanced services over the wireless network based at least on a customer profile of the second client device; and instructing the second client device to use the non-enhanced services for the separate data traffic session based at least on the priority of the second client device for receiving the enhanced services over the wireless network being greater than or equal to the threshold for allocating the IMS enhanced service resources of the wireless network.

\* \* \* \* \*